United States Patent [19]

Fedor

[11] 4,136,638

[45] Jan. 30, 1979

[54] MOUNTING FOR WALL AQUARIUM

[76] Inventor: Joseph J. Fedor, 7 Tulip Ave., Budd Lake, N.J. 07828

[21] Appl. No.: 769,456

[22] Filed: Feb. 17, 1977

[51] Int. Cl.² ............................................. A01K 64/00
[52] U.S. Cl. ................................................ 119/5
[58] Field of Search .......................................... 119/5

[56] References Cited

U.S. PATENT DOCUMENTS

| 1,974,068 | 9/1934 | Greensaft | 119/5 |
| 1,991,683 | 2/1935 | Kelly | 119/5 |
| 2,144,551 | 1/1939 | Skolnick | 119/5 |
| 3,276,428 | 10/1966 | Burch | 119/5 |

Primary Examiner—Hugh R. Chamblee
Attorney, Agent, or Firm—Robert D. Farkas

[57] ABSTRACT

An improved decorative wall mounting for an aquarium is provided which comprises a tank having at least a planar rear panel, reinforced edging surrounding the top and bottom of the tank, first and second channel members extending respectively along the portions of reinforced edging provided on the planar rear panel of the tank, and a frame having a prominent interior border mounted therein complementary to the planar rear panel, a picture slot being defined within the prominent interior border, and having a recessed outer border supplementarily overfitting the planar rear panel of the tank, first and second laterally extending channels determined between the interior and outer borders, the first and second channel members overfitting opposite edges of the interior border and respectively registering in the first and second channels.

5 Claims, 2 Drawing Figures

MOUNTING FOR WALL AQUARIUM

BACKGROUND OF THE INVENTION

This invention relates generally to aquariums, and more particularly, to an improved wall mounted aquarium.

An advantage of the instant invention is that the aquarium may be wall mounted in a picturesque setting, and that setting may be changed with facility, as desired. It is another advantage of the invention that the aquarium is slidably mounted in its wall mounting, and may be easily removed therefrom for servicing.

SUMMARY OF THE INVENTION

Generally speaking, in accordance with the invention, an improved decorative wall mounting for an aquarium is provided which comprises a tank having at least a planar rear panel, reinforced edging surrounding the top and bottom of the tank, first and second channel members extending respectively along the portions of reinforced edging provided on the planar rear panel of the tank, and a frame having a prominent inner border mounted therein complementary to the planar rear panel, a picture slot being defined within the prominent inner border, and having a recessed outer border supplementarily overfitting the planar rear panel of the tank, first and second laterally extending channels determined between the inner and outer borders, the first and second channel members overfitting opposite edges of the interior border and respectively registering in the first and second channels.

Accordingly, it is an object of the invention to provide an improved wall mounted aquarium.

A further object of the invention is to provide a decorative wall mounting for an aquarium.

Another object of the invention is to provide means for releasably mounting an aquarium in a decorative wall mounting.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWING

For a fuller understanding of the invention, reference is had to the following description taken in conjunction with the accompanying drawing, in which.

DETAILED DESCRIPTION OF THE INVENTION

Figures 1, 2:
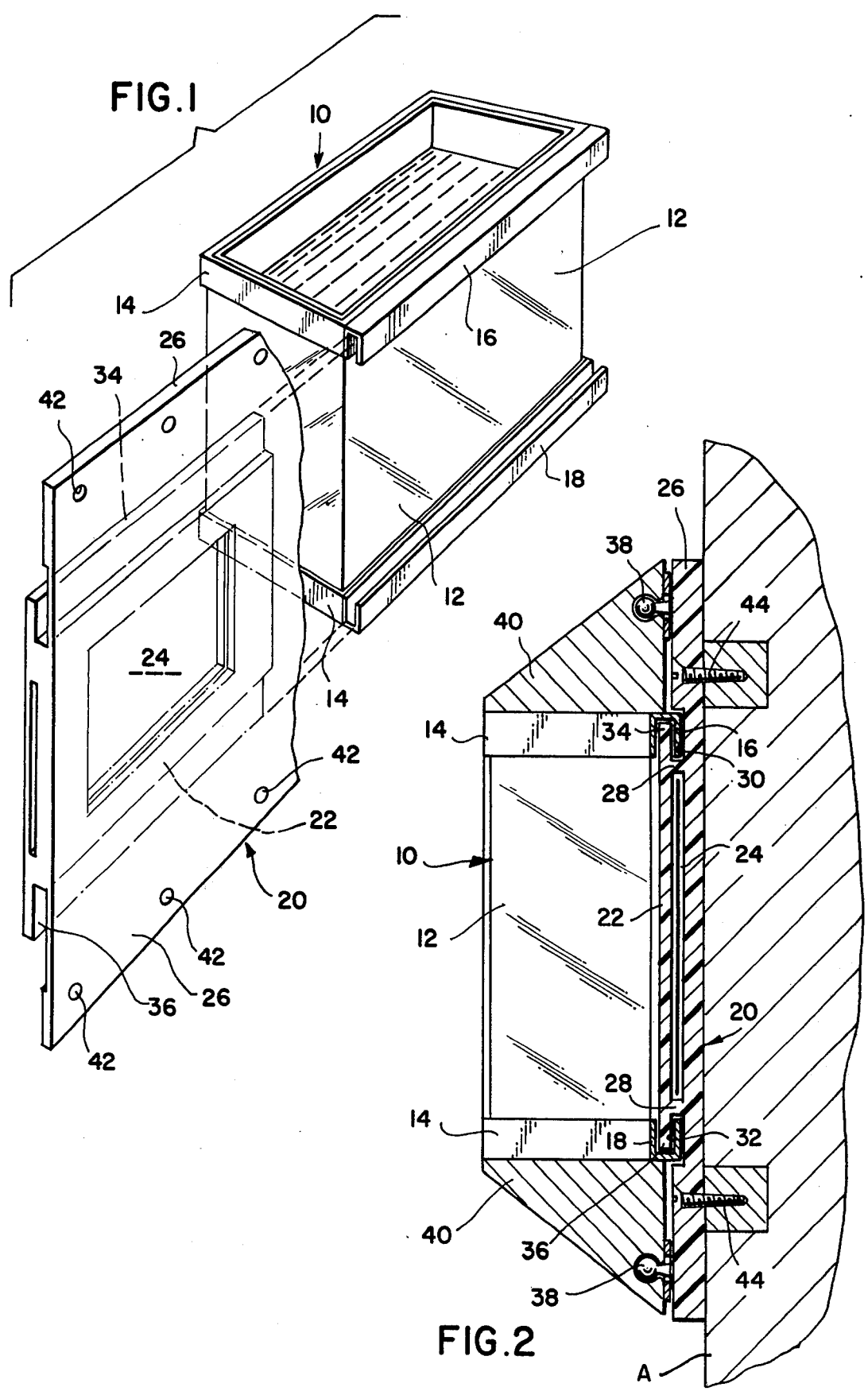
FIG. 1 is a perspective view of an improved decorative wall mounting for an aquarium constructed according to the instant invention.
FIG. 2 is a side elevational view of the embodiment seen in FIG. 1.

Referring now to the drawing, a generally rectangular tank 10 having substantially transparent planar side panels 12 is provided with reinforced top and bottom edges 14. A channel member 16 and a channel member 18 are respectively secured to the top and bottom portions of the reinforced edging extending along the rear panel of tank 10, as est seen in FIG. 1. Channel members 16 and 18 are in aligned substantially parallel relationship having a mirror image relative arrangement. Tank 10 is a typic 1 aquatic vessel suited to hold fish and other marine life.

The tank 10 is releasably mounted on a frame member generally numbered 20 which is fixedly connected to a standard vertical, such as a wall, A. The frame member 20 comprises a prominent inner border 22 having a generally rectangular shape assembled of substantially rigid members 22 defining an interior picture slot 24 in which a canvas painting, print or the like, of predetermined size and shape may be removably mounted. Integrally connected to the inner border 22 is a relatively recessed outer border 26, the inner border 22 and the outer border 26 being substantially concentric and connected by members 28.

A first channel 30 and an oppositely arranged second channel 32 are respectively determined between the corresponding laterally extending members of inner border 22 and outer border 26, as best seen in FIG. 2. Channel members 16 and 18 are adapted to slidably overfit corresponding opposite edges 34 and 36 of inner border 22 and respectively register in corresponding channels 30 and 32, whereby tank 10 is releasably mounted on frame member 20, as shown for instance in FIG. 2.

A plurality of snap means 38 are mounted on outer border 26, and a transparent cover 40, fabricated for instance of plexiglass, overfits tank 10 as mounted on frame 20 and is snap-fit into snap means 38. Snap means 38 may bor instance comprise discrete pairs of leaves mounted on outer border 26 in close spaced relationship.

Frame 20 may be wallmounted by for instance providing corresponding pluralities of through holes 42 in outer border 26 through which a respective corresponding plurality of screws, studs or the like 44 may be tapped into wall A. As seen in FIG. 2, the areas of the wall A into which screws 44 are secured may be reinforced.

As seen, tank 10 is easily removable from frame 20, as by sliding tank 10 laterally until channel members 16 and 18 are released from corresponding opposite edges 34 and 36 of inner border 26. The top panel member of tank 10 is removably mounted, for thereby servicing the tank interior. As mounted on frame 20, the picture mounted in slot 24 may be seen through tank 10, providing a decorative picturesque setting therefor. As desired, frame 20 may be released from wall A and a new picture may be mounted in the slot 24. Cover 40 is removable from its snap-fit mounting on frame 20, and tank 10 may be serviced without releasing it from frame 20.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

What is claimed is:

1. An improved decorative wall mounting for an aquarium of the type including an aqua tank of transparent material having at least a planar substantially rectilinear rear panel and an open mouth portion adjacent thereto, comprising a reinforced edging along opposite laterally extending edges of said rear panel, first and second corresponding channel members secured respectively to said reinforced edging, said first channel member disposed parallel to and adjacent with said open mouth portion, a frame including a prominent inner border complementary to said rear panel, said inner border determining an interior picture slot, and an outer border recessed relative to said inner border adapted to supplementarily overfit said rear panel, first and second laterally extending channels being determined between said inner and outer borders, said first and second channel members being adapted to overfit opposite edges of said inner border and respectively register in said first and second channels, snap means mounted on said outer border of said frame, a cover member overfittable onto said tank and releasably receivable into said snap means, means to cover said open mouth portion with said cover member when said cover member engages said snap means, means to slide a picture into and out of said picture slot whilst said cover member engages said snap means, and means for mounting said frame on a vertical standard, whereby said open mouth portion is opened for access when said cover member is disengaged from said snap means.

2. The combination as claimed in claim 1, said cover member being substantially transparent.

3. The combination as claimed in claim 1, said snap means comprising discrete pairs of leaves, each pair of said leaves being mounted on said outer border of said frame in close spaced relationship.

4. The combination as claimed in claim 1, said mounting means comprising a plurality of screws threaded through a corresponding plurality of through holes provided in said outer border of said frame.

5. The combination as claimed in claim 1, said inner and outer borders being integrally connected, said integral connection therebetween being provided by lateral extensions.

* * * * *